(12) United States Patent
Zinke et al.

(10) Patent No.: US 6,775,468 B2
(45) Date of Patent: Aug. 10, 2004

(54) DISHWASHER PUMP DRIVE

(75) Inventors: Michael Zinke, Wangen (DE); Werner Kaps, Weiler-Simmerberg (DE); Thomas Schlosser, Waldburg (DE); Pietro Navarra, Olgiate Comasco (IT); Bruno Greco, Olgiate Comasco (IT)

(73) Assignees: Diehl AKO Stiftung & Co. KG, Wangen (DE); SISME Societa Italiana Statorie Motori Ellettrici S.p.A., Olgiate Comasco (IT)

( * ) Notice: Subject to any disclaimer, the term of this patent is extended or adjusted under 35 U.S.C. 154(b) by 0 days.

(21) Appl. No.: 10/216,937

(22) Filed: Aug. 12, 2002

(65) Prior Publication Data

US 2003/0034749 A1 Feb. 20, 2003

(30) Foreign Application Priority Data

Aug. 14, 2001 (DE) .......................................... 101 39 928

(51) Int. Cl.[7] ................................................ H02P 5/06
(52) U.S. Cl. ......................... 388/800; 318/254; 318/439
(58) Field of Search ................................. 318/254, 439; 388/800

(56) References Cited

U.S. PATENT DOCUMENTS

| 5,982,122 | A | 11/1999 | Hollenbeck et al. ......... 318/439 |
| 6,008,603 | A | 12/1999 | Jones et al. .................. 318/254 |

FOREIGN PATENT DOCUMENTS

| DE | 25 270 57 | 12/1976 |
| DE | 43 29 046 A1 | 3/1995 |
| DE | 198 45 864 A1 | 4/2000 |
| EP | 0 911 946 A2 | 4/1999 |

*Primary Examiner*—Rita Leykin
(74) *Attorney, Agent, or Firm*—Scully, Scott, Murphy & Presser

(57) ABSTRACT

For their pump drive dishwashers are usually equipped for reasons of cost only with an unregulated asynchronous motor which however is temperamental in terms of the sealing requirements involved, and a simple controller operating circuit (13) for executing the functional program because a rotary speed-controllable drive could not comply with the price limit which is preset by the market. However rotary speed control would be highly desirable in terms of the level of efficiency, energy demand and the generation of noise. In order to embody a dishwasher with a pump drive which involves a low level of wear and which is controllable in respect of its rotary speed without a substantial increase in cost, the use of a dc motor (11) with field windings (19) which can be alternately supplied with current by way of sensor-controlled switching sections (34) is an optimum. In that case a commutator (18) which is responsive to the polarity of the multi-pole permanent-magnetic rotor (17) which is supported in the form of a wet rotor member in the air gap predetermines which of the field windings (19) is to be actuated at the time. Hum phenomena by virtue of the residual ripple of the dc field voltage can be compensated by superimposition of pulse width modulation, in opposite relationship to the variation in amplitude. Such compensation is unnecessary however if pure rotary speed regulation is not effected by way of the controller (14), but infraposed current regulation is afforded for operation at a constant torque at the predetermined rotary speed. This additional circuit (20) for actuation of the field windings (19) is advantageously fitted directly to the motor (11) and in turn actuates it substantially by way of the previous interfaces from the operating circuit (13) which has remained practically unchanged.

8 Claims, 4 Drawing Sheets

DISHWASHER PUMP DRIVE

BACKGROUND OF THE INVENTION

1. Field of the Invention

Figure 1:
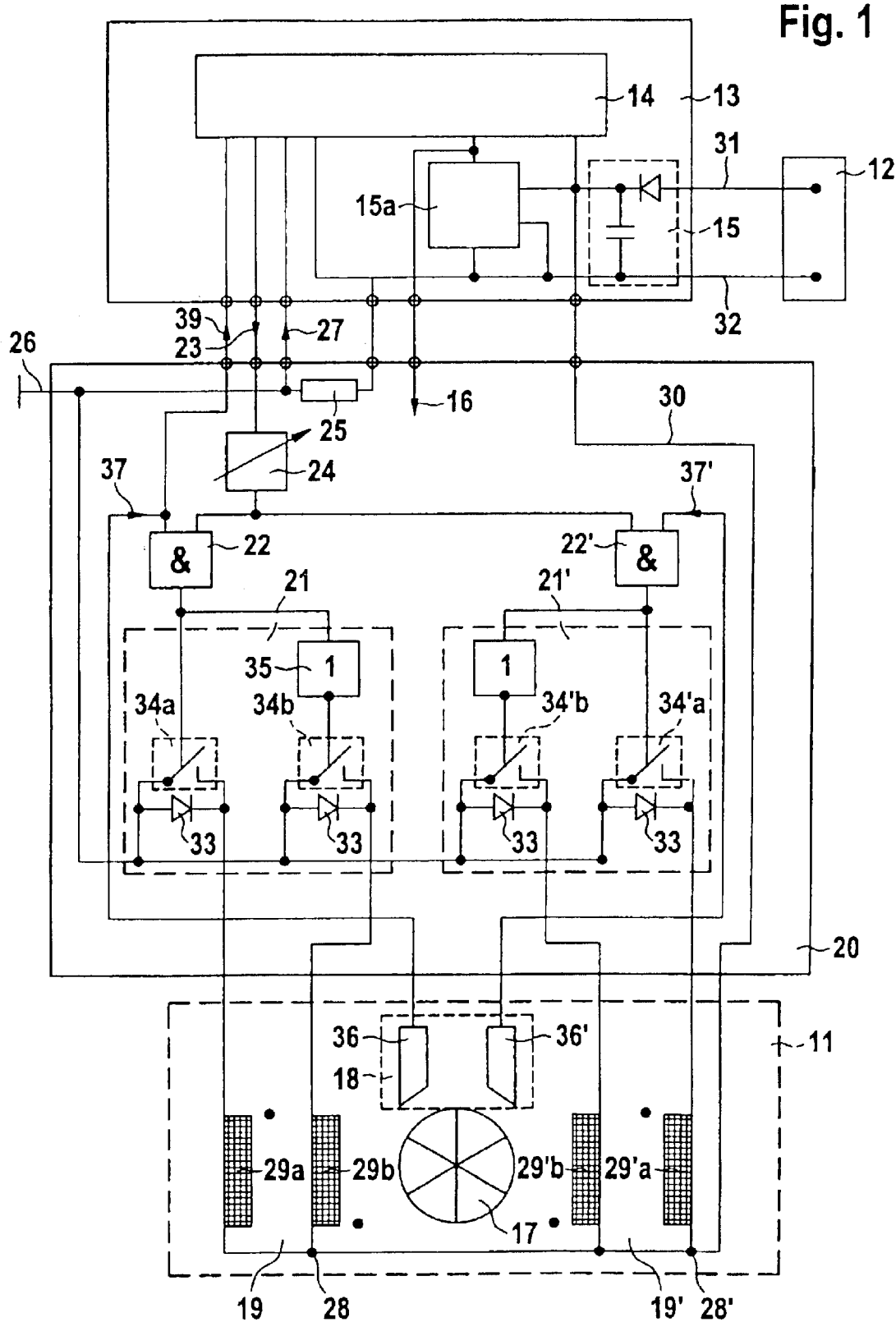

The invention concerns a dishwasher pump drive which comprises an operating circuit without a rotary speed control for the pump motor thereof.

2. Discussion of the Prior Art

It is typical practice to fit to a dishwasher a single-phase asynchronous motor as the drive for its circulating pump, which for the purposes of producing a rotating field by way of a capacitor generates a voltage variation in a second phase position (see EP 1 075 080 A2) and whose rotary speed fluctuates in dependence on load with the consequence of varying noise emission. From the structural point of view such a drive suffers from the disadvantage of requiring a seal between the motor and the pump, which is there subjected to a frictional loading, and for that reason it is susceptible to wear and is therefore a source of additional interference noises which are not constant in terms of spectrum and intensity.

A structurally more advantageous pump drive would be a synchronous motor; more specifically, by virtue of its wide permissible air gap between the stator and the rotor, into which it would be possible to fit a plastic cup which is open towards the water side and in which the rotor would then be supported in the form of a wet rotor member. That would avoid sealing arrangements between the motor and the pump, which are susceptible to wear and which are detrimental in regard to noise. However such a motor cannot start automatically by virtue of its mass moment of inertia, more particularly under load, so it requires an expensive electronic acceleration control to go into a mains-synchronous operating mode. In addition, for reliable starting, an asymmetry of the field is required, more specifically an air gap which is not constant in the peripheral direction. That results in a torque which fluctuates in the rotational movement and which in operation results in an unacceptable noise nuisance. For that reason that drive has not acquired any significance on the market.

A desirable arrangement for start-up control for gentle and accordingly low-noise operation or for optimising the speed for different, energy-optimised washing programs would be possible with multi-phase symmetrical synchronous motors which however also require expensive and complicated electronic control circuits for operation thereof, the use of such circuits being precluded in dishwashing machines for cost reasons.

In order to be able to meet cost constraints which are predetermined by the competition situation in the market, it is therefore necessary in practice to be satisfied with unregulated asynchronous motors as the drives in dishwashers, and it is then necessary to accept the generation of noise, as typically occurs for example when switching on the pump motor, by virtue of the steam surge or jet when changing between a hot water treatment and a cold water treatment, or after pumping out the water when the pump runs empty.

SUMMARY OF THE INVENTION

The object of the present invention is to provide as a substitute for the inexpensive asynchronous drive a dishwasher pump drive which enjoys the structural advantages of a wet rotor member and which if necessary also permits inexpensive rotary speed control for the purposes of optimising operation of the motor from an electrical and acoustic point of view; and which therefore in spite of the large air gap between the stator and the rotor can be operated with a high level of efficiency and a low level of noise over a wide range of rotary speeds without having to lose out on the previous costing aspect, due to the more complicated and expensive circuitry which is required for that purpose.

In accordance with the invention that object is attained by the combination of the essential features recited in the main claim. In accordance therewith, the pump drive is a dc motor with a permanent-magnetic rotor which can still be operated with a good level of efficiency even with a comparatively large air gap and which permits sensor-controlled electronic computation with particularly simple switching means. In addition it is now possible for additional rotary speed control to actually have access to the operating circuit for a dishwasher, which is already present as it is used as standard and which hitherto does not yet permit rotary speed control of the pump motor.

In accordance with a development of the invention, for that mode of operation, the motor housing is equipped with an additional circuit for connection to the conventional operating circuit. A pulse sequence which is of high frequency in relation to the repetition rate of the commutator signals and which can be derived from the processor of the operating circuit and which has a variable frequency or a pulse duty factor which is now variable switches the field current circuit without the need to have to provide for that purpose the more expensive and complicated conventional half-bridge circuits, and thus by way of simple change-over switches, in the manner of a chopper control arrangement (principle of the reducing adjusting device), provides a variable mean motor voltage for influencing the rotary speed of the pump motor.

Still more advantageous than direct rotary speed control is indirectly influencing the rotary speed by way of the mean motor current. For, regulation to a constant motor current in accordance with that development of the structure according to the invention directly involves influencing the torque and thus by way of a constant torque results in particularly smooth operation of the electronically commutating dc motor.

BRIEF DESCRIPTION OF THE ACCOMPANYING DRAWINGS

Figure 2:
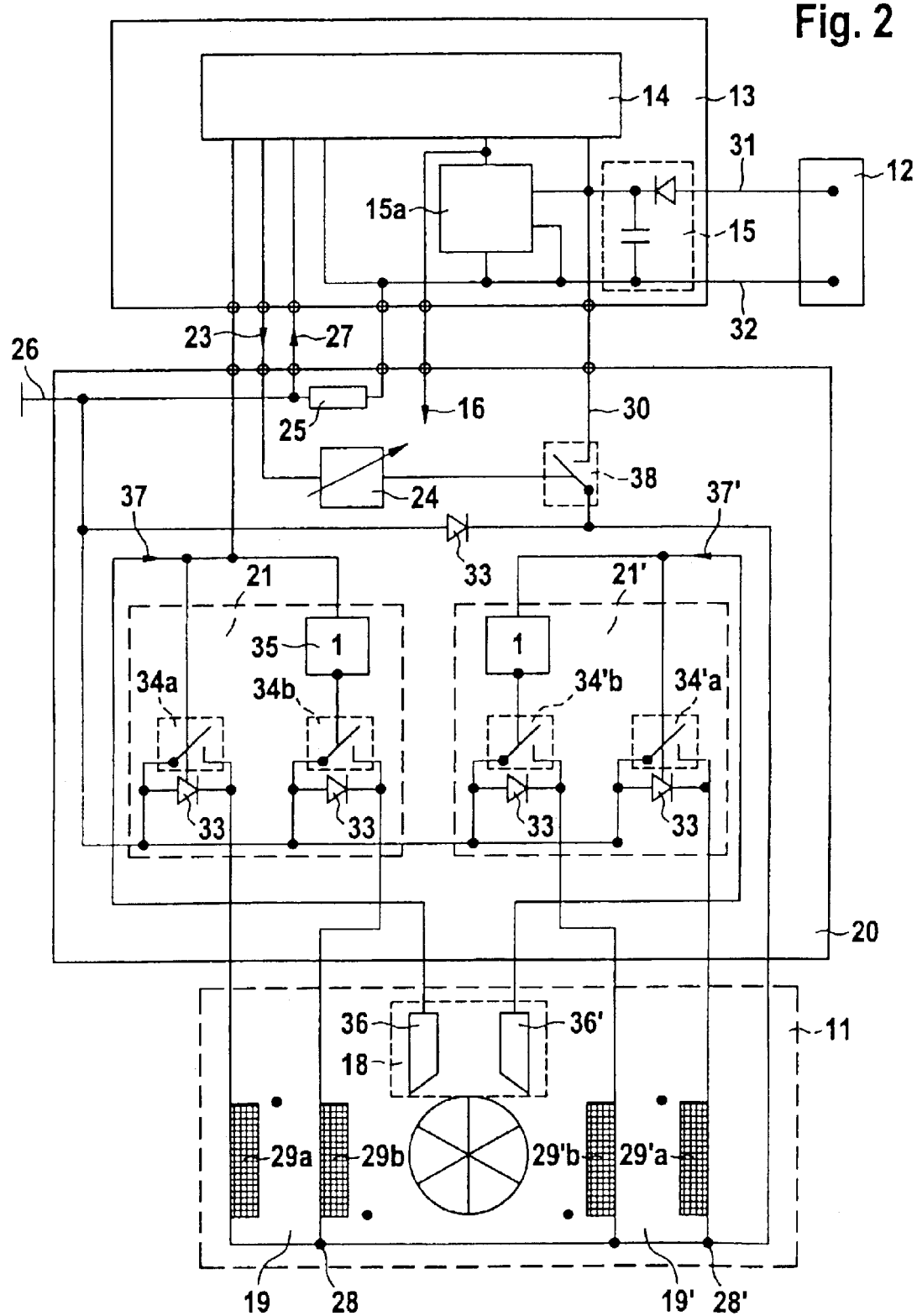
Figure 3:
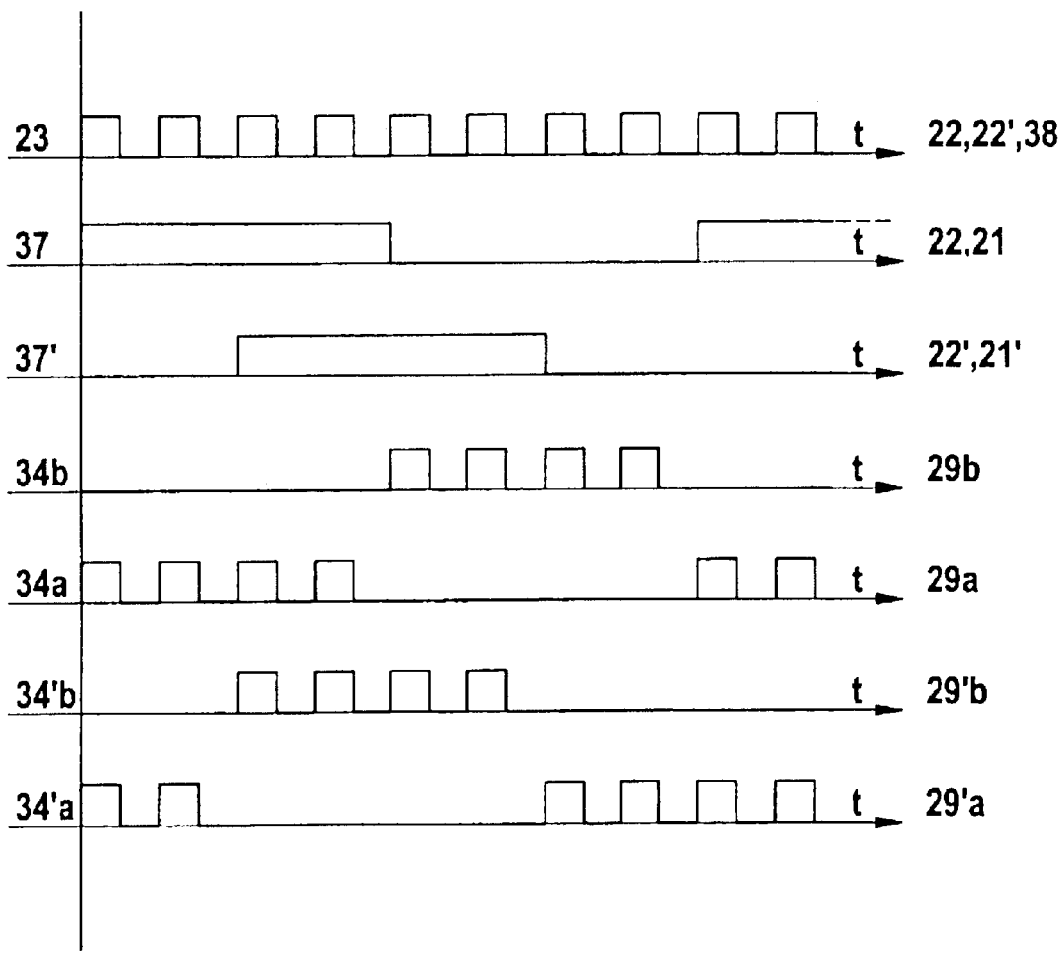
Figure 4:
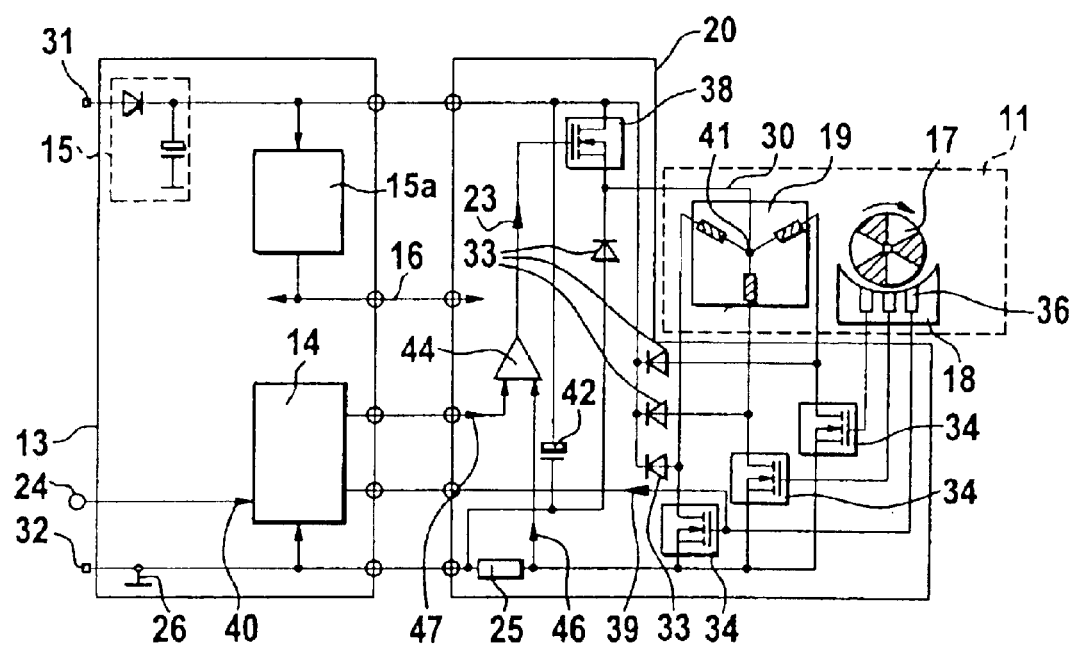

In regard to details and desirable developments of the structure according to the invention and the advantages thereof, besides the further claims attention is also directed to the description hereinafter of preferred embodiments of the invention which are diagrammatically shown in the form of block circuit diagrams in the drawing, being limited to what is essential. In the drawing:

FIG. 1 shows an additional circuit according to the invention, downstream of the conventional dishwasher operating circuit, for rotary speed control of a dc motor which in this case is a two-phase motor, as the pump motor, FIG. 2 shows an additional circuit which is modified in relation to that shown in FIG. 1, FIG. 3 shows a pulse diagram to illustrate the function in principle of the two additional circuits shown in FIG. 1 or FIG. 2, and FIG. 4 shows a circuit diagram for a design of the pump motor control according to the invention, which is modified in relation to FIG. 1 and FIG. 2.

DETAILED DESCRIPTION OF PREFERRED EMBODIMENT

The pump motor 11 which is disposed in the sump of a dishwasher is supplied with current from the domestic mains system 12 by way of an operating circuit 13 which for reasons of cost only implements a switch-on/switch-off function for operation of the pump in accordance with the sequence of a time-controlled and sensor-controlled washing program which is preset in a microcontroller 14. A rectifier 15 which is present in the operating circuit 13 feeds an electronic voltage transformer 15a which supplies a small-signal voltage 16, in particular for operation of the microcontroller 14 as well as active sensors connected for example thereto, for controlling the program procedure of the dishwasher.

In order to provide the drive structure as described in the opening part of this specification with a rotor which is supported in a wet-operating condition and to retain as far as possible the operating circuit 13 which has been used hitherto, but nonetheless in order to be able to permit rotary speed control of the pump drive, the pump motor 11 which permits a sufficiently wide air gap for use of the wet rotor cup between the stator and the rotor is in the form of a dc voltage motor with permanent-magnet rotor 17 and with a sensor commutator 18 for rotor position-dependent pole reversal in respect of the magnetomotive force of the field winding 19. The field circuit 30 thereof can be fed from the rectifier 15 which is provided in any case on the circuit board of the operating circuit 13, which makes it unnecessary to incur additional costs for operating the dc motor from the ac voltage mains system.

As therefore the dc voltage for the field circuit 30 of the pump motor 11 is branched from the operating circuit 13 which in turn however for reasons of cost is usually equipped downstream of a half-wave rectifier 15 only with a smoothing capacitor of finite size, the motor dc voltage involves a superimposed mains hum which is dependent on load in respect of its intensity and which causes the field direct current to correspondingly fluctuate. In regard to the magnetomotive force in the field windings, that results in a physiologically troublesome electrodynamic noise generation. In accordance with a further aspect of the present invention however to which independent patentability is also attributed, that can be controlled in a surprisingly simple manner, as will be described in greater detail hereinafter.

An additional circuit 20 for rotary speed control of the pump motor 11 is fitted directly on to the housing of the motor 1, with very few interfaces. The operating circuit 13 is now preferably no longer connected directly to the motor 11 but, as can be seen from the drawing, by way of that additional circuit 20. Current supply also for the active circuit components of the additional circuit 20 is effected from the above-mentioned voltage transformer 15a which is present in any case on the circuit board of the operating circuit 13 for the internal low-voltage supply.

In the case of the embodiment shown in FIG. 1—with partial field coils 29a, b wound in opposite directions on the motor 11—the additional circuit 20 has change-over switches 21 for changing polarity in respect of the magnetomotive force of the field windings 19 in dependence on which magnetic polarity is signalled on the basis of the instantaneous rotational angular position of the multi-pole permanent-magnetic rotor 17 by the commutator 18, by means of its sensor signal 37. In the present case given by way of example, that signal 37 is triggered by the sensor 36 detecting the approach of a predetermined magnetic polarity, in the course of the rotational passing movement of one of the dipoles of the rotor 17. With its signal 37, at the position of the rotor 17 which applies in regard to torque production, the commutator 18 enables an AND-condition 22 which is in series with the circuit 30 by way of the field winding 19.

The second AND-criterion thereof is a pulse sequence 23 which is of high frequency in relation to the repetition rate of the signal 37. It is derived with a pulse frequency rate which is preferably above audible frequencies, of at least about 16 kHz, from the internal clock in the microcontroller 14. For rotary speed control of the dc motor 11, that pulse frequency rate is now variable in respect of its pulse duty factor, which is symbolically indicated in the drawing by an adjusting member 24 illustrated on the additional circuit 20.

Insofar as a manual actuating option for the adjusting member 24 is required, the function of the adjusting member 24 (contrary to the view in principle in the drawing), to meet the demands of a practical situation, will not be embodied on the board 20 at the motor 11 which involves difficult access, but on the circuit board of the operating circuit 13, which is installed behind the operating panel of the dishwasher, and there preferably in terms of software in the processor 14 on which the external control parameters act and which controls the implementation of the working program.

At any event the mean field voltage which is operative in reduced manner in accordance with the nature of the function of a reducing adjusting device can be varied by way of the pulse duty factor in the pulse sequence which switches over the field winding 19 by way of the switches 21, and thus the instantaneous rotary speed of the rotor 17, which in itself is dependent on load, can be influenced.

To provide the above-mentioned noise suppression effect, it is desirable if the controller 14 on the operating circuit 13, by way of an analog input, detects the amplitude variation in respect of time, of the only slightly smoothed field voltage at the output of the mains rectifier 15 and thus—that is to say, independently of the quasi-static presetting of the rotary speed control—slightly influences the pulse width in inverse proportion to the instantaneous amplitude, by way of the pulse duty factor. For, this compensates for the influences of the fluctuating dc mains voltage on the electrodynamic noise production in the stator and thus, without a particular increase in circuitry cost and complication, highly effectively suppresses the above-described electroacoustic action, which in itself is a nuisance, of the residual hum in the field circuit 30.

An additional circuitry control at the commutator 18, which is taken into account in the circuit diagram in FIG. 1, supplies the microcontroller 14 at the repetition rate of the signal sequence 37 with a rotary speed feedback message which can be evaluated in the controller 14 for example for display and monitoring functions and in particular for a reference value-actual value comparison for rotary speed regulation purposes; but also for adaptive program configuring for example in dependence on the hydraulic pump output, for example if, after the water has been pumped out, sucking in air does not produce a significant change in rotary speed.

If, as is also illustrated in FIG. 1 of the drawing, one of the two supply lines 31, 32 coming from the domestic mains system 12, preferably the neutral conductor 32 thereof, is interrupted in the operating circuit 13 to loop it by way of a current measuring resistor 25 to the ground 26 for the additional circuit 20, the measurement voltage 27 which drops in dependence on load thereat, in the microcontroller 14, can be used to obtain items of information about the actual operating behaviour of the motor 11 for further monitoring and regulating tasks. Thus, a significant rise in the voltage drop as a result of an excessive motor current is an indication of a threat of overheating or even mechanical blocking of the pump drive, which is recognised in the controller 14 and results in at least temporary throttling of the power of the motor 11 or as a precaution results in it being switched off entirely, without having to use specifically thermally reacting motor-protection switches to provide such protective measures. Because of the system involved, that measuring resistor 25 is also shown in the drawing on the circuit board of the additional circuit 20 although in practice it can be disposed without any problem directly at the separation point of the neutral conductor 32 on the board of the control circuit 13.

Control of the magnetomotive force in the field winding 19, which is dependent on the position of the rotor, can in principle be effected in a manner known from the inverter circuit art, by way of half-bridge circuits each comprising the series connection of two switches which are controlled in opposite relationship, with a potential which fluctuates floatingly at the centre tapping thereof, for the periodic reversal in polarity of the magnetomotive force of the field winding 19. However, conditions which are manageable in terms of potential (because of the relationship to a common ground potential), with a less expensive switch control arrangement (as a consequence of only half the number of individual switching sections 34 to be actuated) are afforded if, as shown in FIG. 1, the dc motor 11 includes at least one two-part field coil 19 with centre tapping 28 between its two oppositely wound partial coils 29 (29a, 29b). For field pole reversal, it is now sufficient for those two partial coils 29 which are connected in series in opposite relationship to be cut in, in relation to its centre tapping 28, alternately by means of a simple change-over switch 21—either the one partial coil 29a or the other partial coil 29b—and therefore with mutually opposite magnetomotive force directions in the field circuit 30 from the phase connection to the mains rectifier 15 in relation to the ground 26 of its mains neutral conductor 32. The two partial coils 29a, 29b therefore act on the air gap in relation to the multi-pole permanent-magnetic rotor 17 like two oppositely poled field coils 19=29a+29b, which is shown in the drawing by the association of dots for the winding direction. Therefore the two partial coils 29a, 29b can be fitted by the manufacturer in relation to the field winding 19 more easily than a bifilar winding 29 at which then the connections of the change-over switch 21 are freed in relation to the centre tapping 28 and connected to the field circuit 30.

Apart from the advantage in terms of production procedure of producing both field coils 29a, 29b in one winding operation, the bifilar winding 29=29a–29b also has the advantage that, as a consequence of a low level of leakage inductance, there is a maximum inductive coupling between the two partial coils 29a–29b. That reduces the inductive switch-off current which occurs in the switching operation, by way of the semiconductor switching sections 34, operated in the breakdown mode, of the change-over switches 21 or by way of the freewheel diodes 33 thereof, to a value which is not critical in regard to operating procedure. For, the lower the level of leakage inductance, the correspondingly less is the energy stored therein. The energy stored in the motor field is maintained by the second one of the partial field coils 29a, b and its freewheel diode 33 which is now operated in the forward direction, as, in accordance with Lenz's law of energy conservation, the current through the one of the two partial coils 29a, b which is just to be switched off continues in the previous direction. Instead of switching sections 34 with additional avalanche-resistant freewheel diodes 33, avalanche-resistant MOS field effect transistors can also serve as the switching sections 34. These are alternatives which further reduce the costs of the additional circuit 20.

One of the two switching sections 34a of each change-over switch 21, 21' is actuated directly by way of the commutator 18 and the other 34b is actuated by way of an inverter 35 so that there is only ever one of the two switching sections 34a, 34b that is closed and thus there is only one of the two partial coils 29a, 29b in FIG. 1 which involves magnetomotive force. That ensures that the electromagnetic polarity which is precisely appropriate for torque production in the stator always co-operates with the instantaneous position of the permanent-magnetic rotor 17.

The block circuit diagram in FIG. 1 also takes account of the fact that, in the interests of smooth operation and a high level of electromechanical efficiency, it is desirable to design the dc motor as a two-phase motor, to act as the pump motor 11, that is to say for a second field winding 19' (which is similarly wound in a bifilar manner) to be connected in parallel in phase-shifted relationship electrically through 90°, with respect to the previously considered field winding 19, opposite same in relation to the rotor 17. In this case, to provide a clear switching characteristic, it is desirable for the commutator 18 to be embodied by two magnetic field sensors 36, 36' which respond in electrically phase-shifted relationship through 90° (for example once again Hall sensors) which are associated by way of their change-over switches 21–21' with a respective one of the two field windings 19–19'. The sensors 36, 36' are fixed to the circuit board for the additional circuit 20 in such a way that upon the application thereof to the motor 11 they project through openings in the housing thereof in order to detect the current magnetic field which is dependent on the instantaneous position of the rotor, and thus in dependence on polarity, by way of the change-over switches 21, 21', to implement a magnetomotive force which is respectively in-phase for torque production, in the field windings 19, 19' of the stator.

The AND-conditions 22, 22' which are implemented for rotary speed control by means of the effective motor voltage in the field circuit 30, from the sensor signals 37, 37' for the magnetomotive force direction and the pulse sequence 23, which is variable in its pulse duty factor, for the pulse width-modulated field current, which for that purpose are connected together in the embodiment of the circuitry shown in FIG. 1 to a coincidence gate '&' per field winding 19, 19', can also be embodied in a decentral arrangement. For that purpose, as shown in the configuration of the circuit illustrated in FIG. 2, control of the change-over switches 21, 21' is effected directly with the sensor signals 37 and 37' respectively of relatively long switching duration (see FIG. 3); while the second condition of the AND-conditions 22 and 22' respectively is not implemented here by a coincidence gate upstream of the change-over switches 21, 21', but by a reverse current-decoupled series switch 38 directly in the field circuit 30, for example just downstream of the feed from the high-voltage rectifier 15 from the operating circuit 13 into the additional circuit 20, as shown at top right in FIG. 2. The operating characteristic of the variable-speed pump motor 11 is in no way altered by this modified embodiment of the AND-condition 22 and 22' respectively in the form of superimposition of the high-frequency pulse sequence 23 and the sequence, which is of low frequency in relation thereto, of the sensor signals 37, as can be seen from the dependencies shown in FIG. 3.

The development according to the invention shown in FIG. 4 involves the production of even less noise. Here, the pump drive is in the form of a dc motor 11 with a considerably improved performance in terms of operating smoothness by virtue of three (in this example unifilar) field windings 19 for a rotor 17 with permanent-magnetic pairs of poles which are angularly displaced relative to each other, and rotary speed regulation is effected by way of an infraposed field regulating circuit. As this acts directly on the torque for the rotary speed which is predetermined at that time, by way of the motor current, and thus regulates load-dependent fluctuations in rotary speed to afford a constant torque, the mode of operation is so smooth under all operating conditions that the above-described counteracting control which is dependent on the ripple downstream of the rectifier 15 is now no longer required at all.

For the situation of a comparatively long supply line 31, 32 between the operating circuit 13 and the additional circuit 20, the latter is desirably provided at its input side with a support capacitor 42 of high capacitance, for example as diagrammatically shown with an electrolytic capacitor, in order to stabilise the field circuit 30 which is fed from the half-wave rectifier 15. The three arms of the field winding 19 are connected by way of a common star point 41 again into the field circuit 30 with its reducing adjusting switch 38 for cyclic current control. Freewheel diodes 33 again respectively bridge over the switch 38 to the end, which is remote from the star point 41, of the respective arm of the field winding 19. Each winding end (see also in this respect identity with the circuitry shown in FIGS. 1/2) is connected to ground 26 by way of an MOS-FET switching section 34 which is sensor-controlled by the commutator 18, in order to temporarily close the field circuit 30, in dependence on the position of the rotor, by way of the respective arm of the winding 19.

An actual current value 46 is now tapped off at the current measuring resistor 25 upstream of the ground 26 of the field circuit 30, and applied to a hysteresis-affected comparator 44 whose comparison input is supplied with a reference current value 47 from the controller 14. In addition, one of the sensors 36 taps off an actual rotary speed value 39 which is compared in the controller 14 to an external rotary speed presetting 40. The resulting instantaneous deviation in rotary speed is converted in the controller 14, by virtue of the known operating characteristics of the motor 11, into the reference current value 47 which is applied to the comparator 44. The switching hysteresis thereof determines the pulse sequence rate and the pulse duty factor thereof at the switch 38, for the current deviation which has just occurred. Thus, the motor current is increased until the predetermined rotary speed is reached, and then the motor circuit 30 is regulated by way of the current pulse duty factor of the switch 38 to the constant current for the predetermined rotary speed. That affords an additional contribution to promoting smooth operation because of a constant torque; but also because the temporarily powerful current rise which otherwise results from necessary overlap in switching between the individual arms of the field winding 19 (with the consequence of electromagnetic noise production in the stator plate pack of the motor 11) is now prevented by the rapid current regulation effect.

The controller 14 does not necessarily have to be embodied only on the external operating circuit 13; for a motor 11 which can be used in self-sufficient manner at any event (differing in that respect from FIG. 4) the functions of the superimposed rotary speed and current regulating circuits are desirably combined in a specific processor for that purpose (corresponding to the controller 14), which is disposed together with the field current reversal arrangement, on the additional circuit 20, directly at the motor 11.

In order therefore to embody dishwashers which for cost reasons are usually equipped with a pump drive involving a frictional sealing arrangement and for operation thereof only with a simple controller operating circuit 13 for performing the operational program, but in particular without possible options in terms of influencing rotary speed, without a substantial increase in expense, with a pump drive which has a low rate of wear and which is controllable in respect of its rotary speed, the use of a dc motor 11 is the optimum, whose field windings 19 are alternately supplied with current by way of sensor-controlled switching sections 34 by way of a current measuring resistor 25 to ground. A commutator 18 which for that purpose responds to the polarity of the multi-pole permanent-magnetic rotor 17 predetermines which of the field windings 19 is to be actuated at the time. A pulse sequence 23 derived for example directly from the processor 14 of the operating circuit 13 or obtained in dependence on the rotary speed by way of a hysteresis-affected current comparator 44 and thus with a variable pulse frequency rate and a variable pulse duty factor determines the field voltage or motor current and thus the rotary speed or torque of the motor. Compensation, which is appropriate in regard to direct rotary speed regulation, of the mains hum in the field circuit 30 by counter-controlling pulse width modulated by the mains hum is unnecessary in relation to influencing the rotary speed by way of a subordinate current regulation to a constant level of torque at the predetermined rotary speed. In that way it is possible to achieve high starting torques because the magnetomotive force can be deliberately temporarily pushed beyond the nominal value into a condition of magnetic saturation; optionally however it is also possible to implement operation with a minimum level of power output and noise generation for example for sporadic 'gentle' pumping even when there is a lack of water.

An additional circuit 20 for actuation of the field windings 19 by way of the switching sections 34 is desirably fitted directly to the motor, with Hall sensors engaging into the motor housing as the sensor commutators 18, and in turn is actuated substantially only by way of the standard interfaces from the operating circuit 13 which is left practically unchanged. The arrangement of the switching sections 34—and change-over switches 21 for bifilar field windings 19—in the additional circuit 20 directly on the stator of the motor 11 results in short lines for the harmonics-rich high switching voltages and therefore represents an only very slight interference loading in regard to the controller arrangement 14 for the regulating tasks in the remotely disposed operating circuit 13 or directly on the additional circuit 20.

What is claimed is:

1. A pump device including an electronically commutating dc motor with a wet-supported permanent magnet-rotor (17) for a dishwasher, wherein said dishwasher is equipped with an operating circuit (13) for the implementing of an operating program in the absence of providing the pump motor (11) with a therewith connected speed control, an auxiliary circuit (20) adapted to a motor housing for said motor being provided with a speed control for said pump motor (11) through a mean motor voltage which is operative in a field current circuit (30), said field current circuit (30) being supplied with current in a type of chopper control through commutator switching sections (34) rotor position-dependently controlled by sensor signals (37), which include avalanche-fixed free-running diodes (33) or configured as avalanche-fixed field effect transistors (FET) forming the switching sections, and an AND-condition which is pulsed through a pulse sequence (23) with a variable keying ratio and which includes a series switch (38) arranged in said field current circuit (30), said sensor signals (37) being connected to a microcontroller (14) for providing an answer-back of rotational speed to effect a rotational speed regulation and therefrom adaptive programming configurations, said microcontroller further receiving an input signal dependent upon the motor current in the form of a measuring voltage (27) which drops off at a current measuring resistance (25) in the field current circuit (30).

2. Pump drive according to claim 1, wherein coincidence gates (22) are arranged in said field current circuit (30) upstream of said switching sections (34) in lieu of said series switch (38) for providing said AND-condition, said coincidence gates being supplied with the pulse sequence (23) and with the sensor signals (37).

3. A pump drive according to claim 1, wherein the microcontroller (14) converts an instantaneous rotary speed deviation of the motor (11) into a reference current value (47) which besides an actual current value (46) for the motor current in the field current circuit (30) is applied to a hysteresis-affected comparator (44) from which the series switch (38) is cyclically controlled.

4. A pump drive according to claim 1, wherein a commutator (18) supplies the microcontroller (14) with said sensor signals (37) as actual rotary speed information also for rotary speed-dependent control interventions in a hydraulic pump output.

5. A pump drive according to claim 1, wherein the pump motor (11) has at least one field winding (19) which comprises two partial windings (29a, 29b) connected in series in opposite relationship and which is connected into the field current circuit (30) with a center tap-off (28) and further by way of a sensor-controlled change-over switch (21), between the two partial windings (29a, 29b).

6. A pump drive according to claim 5, wherein the two partial windings arc coils (29a, 29b) of said field winding (19) in the form of a bifilar winding (29—29) with a center tap-off (28).

7. A pump drive according to claim 1, wherein the motor (11) is equipped with at least two field windings (19) which are angularly displaced relative to each other for the passage therethrough of a variable pulse sequence (23) in a time-displaced relationship and which are connected to a common star point (41) whereby through switching section (34) so as to be actuated in succession by a commutator (18), arranged in field current circuit (30).

8. A pump drive according to claim 1, wherein for the compensation of electroacoustic hum excitation of the motor (11) by virtue of a poorly smoothed dc motor voltage for the field circuit (30), the pulse width is modulated in inverse dependency on the amplitude of the hum voltage at the output of a mains rectifier (15) which is selectively included on the overall operating circuit (13) or in the auxiliary circuit (20) which is connected to the motor.

* * * * *